Oct. 21, 1958  J. J. MANCUSI, JR  2,857,184
FLUID-SEAL CONSTRUCTION
Filed Sept. 28, 1956
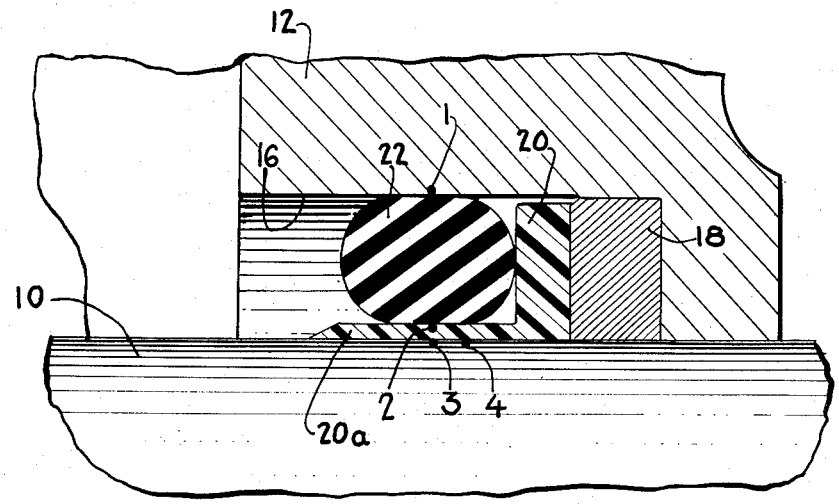
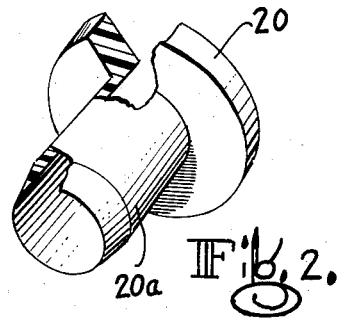
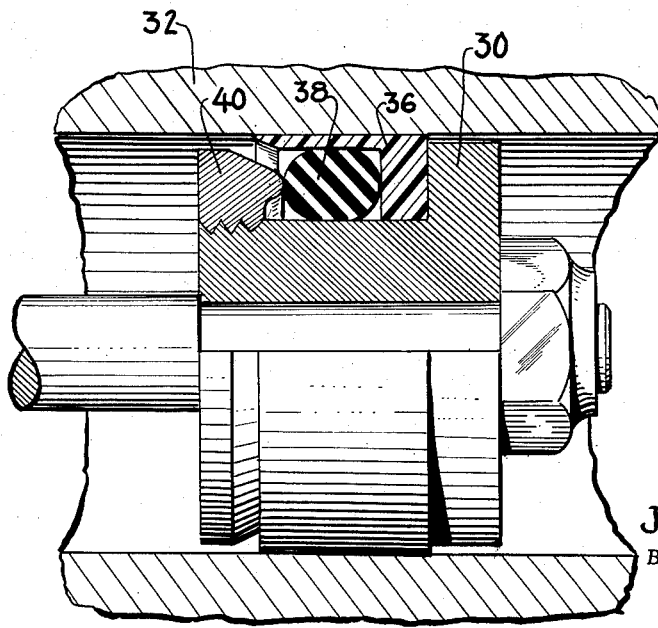
INVENTOR.
Joseph J. Mancusi Jr.
BY
*Joseph B. Taphorn*
ATTORNEY United States Patent Office
2,857,184
Patented Oct. 21, 1958

2,857,184
FLUID-SEAL CONSTRUCTION
Joseph J. Mancusi, Jr., Tuckahoe, N. Y., assignor to Altair Inc., Mount Vernon, N. Y., a corporation of New York Application September 28, 1956, Serial No. 612,609
2 Claims. (Cl. 286—26)

This invention relates to fluid-seal constructions and more particularly to fluid-seal constructions for relatively movable surfaces.

Fluid-seal constructions between relatively movable surfaces are the source of considerable frictional resistance. The problem is particularly acute where high pressures in the order of five thousand (5000) p. s. i. (pounds per square inch) are involved. It is compounded when a leakproof seal must be maintained over a wide range of pressures, as from zero (0) to five thousand (5000) p. s. i.

Accordingly, it is a primary object of this invention to provide a high-pressure fluid-seal construction for relatively movable surfaces that offers only a minimum of frictional resistance to their relative displacement.

A further object of the invention is to provide such a seal construction which also is leakproof over a wide range of pressures.

Another object of the invention is to provide a seal construction of the aforementioned character which also is simple of construction and easy of manufacture.

The invention resides in the advantageous use of a ring L-shaped in cross-section and made of a material having a low coefficient of friction with a relatively movable part, such as "Teflon" (tetrafluoroethylene polymer) or "nylon" (polyamide resin) when the relatively movable part is metal, and of an O ring generally round in cross-section and formed of a resilient material such as neoprene or rubber. The L-shaped ring is so carried by one of two relatively movable mating parts that its one leg lies along the surface of the other part and with its free end pointed upstream. The O ring is forcibly inserted between the one leg of the L-shaped ring and the carrying one of the relatively movable parts and through the internal stresses thereby set up forces the one leg of the L-shaped ring into sealing relation against the surface of the other part. It can be seen that, with a construction such as described, the development of pressure on the upstream side would set the rings and seem to perfect the seal due to the forces acting behind the L-shaped ring to force the one leg against the surface of the other part. With the build-up in pressure, there should be a proportionate increase in friction, as is well known.

It is a feature of applicant's fluid-seal construction that this expected increase in friction does not occur. Admittedly, the coefficient of friction between materials such as "Teflon" and metal is quite low. Nevertheless, the friction which should have occurred when operating at high pressures has not materialized. This strange phenomenon would seem to be due to some unusual coaction or cooperation between the O and L-shaped rings and the associated relatively movable parts. The seal remains leakproof throughout.

These and other objects, features, and advantages will become apparent from a reading of the following specification when considered with the acompanying drawing in which:

Fig. 1 is a vertical, sectional view of a fluid-seal construction of the invention incorporated about a rod or shaft subjectable to rotary or axial displacement or both;

Fig. 2 is a perspective view of an L-shaped ring used in the invention; and

Fig. 3 is a vertical, sectional view of a fluid-seal construction of the invention incorporated in a piston.

Referring to the drawing and especially to Figs. 1 and 2 thereof, a metal rod or shaft 10, which may be subjected to rotary or axial displacement, is shown as slidably mounted within a bearing or bushing 12 forming part of the right-hand wall of a vessel or container adapted to hold fluid under high pressure of the order of five thousand p. s. i. The bearing is recessed at 16 from its inner side and may first receive a metal ring 18 formed of a suitable back up or bearing material for the shaft 10. Next an L-shaped ring 20 is located within the recess.

This ring, preferably formed of "Teflon" due to its durability and low coefficient of friction with metal, is L-shaped in cross section. As seen in Fig. 2, it is generally hat shaped, with the long leg 20a of the ring constituting the inner cylindrical ring adapted to lie along the relatively movable metal surface of the shaft 10.

Seated behind and upon the ring 20 is a resilient O ring 22. This ring, preferably formed of neoprene, is forced in between the back surface of the cylindrical portion 20a of the L ring and the adjacent surface of the bearing recess 16. Because of being squeezed into place, the O ring, through the internal stresses set up in it, will conform with the contacting metal surface of the bearing recess 16 at 1 and with the contacting surface of L-shaped ring portion 20a at 2 to form seals. Seals will be effected about the shaft 10 at 3 due to the conformation of the "Teflon" ring 20 to the shaft under the influence of the stress forces in the O ring 22. It will be evident then at 2 a complete seal will obtain at the initial or low pressures and that the friction will be at a minimum because the sealing contact will occur mostly at point 3.

But the advantages of the invention are not confined to its complete seal at low pressures with little friction; the complete seal obtains even at very high pressures, and surprisingly, without a corresponding increase in friction. Apparently, the O ring deforms under high pressure as it is forced against the metal ring 18 so that it engages the "Teflon" ring portion 20a over a wider area to cause additional sealing to take place between the ring 20 and the shaft 10 as at point 4. Just why there is not a generally corresponding increase in friction is not evident. It will, of course, be observed that as the O ring deforms under pressure, the sealing areas at 1 and 2 increase to provide adequate sealing at the higher pressures.

Fig. 3 shows the invention embodied in a piston seal. Here a piston 30 is shown as slidably supported within a cylinder wall 32. The piston is formed with an interiorly directed recess 34 which first receives the L-shaped in cross-section ring 36. Due to the fact that the relatively movable part, namely, the cylinder wall 32, now lies outside of the "Teflon" ring 36, the ring here used is not hat shaped; instead, the long leg 36a forms the exterior portion of the ring while the short leg thereof constitutes an inwardly directed portion.

After the "Teflon" ring 36, the O ring 38 is placed in the recess 34 about the piston 30. It thus engages the exterior of the piston and the interior of the "Teflon" ring portion 36a. It is of such cross-section that when the piston is placed within the cylinder, the "Teflon" ring is forced into engagement with the cylinder wall and the subsequent mounting deforms the O ring to set up the internal stresses therein which form the necessary seals as explained in connection with Fig. 1.

Since a piston is subjected to abrupt to and fro motion, it is best to secure the O ring against movement off of the end of the piston. To this end, a ring 40 is threaded upon the end of the piston. The external diameter of this ring of course will be such as not to prevent the full application of fluid pressure to the O ring 38 and the L shaped in cross-section ring 36. Sealing action for this construction would seem to be the same as for the embodiment of Fig. 1.

Evidently, then, there has been provided a new and useful seal construction providing the advantages of complete seal at very high as well as low pressures with unexpectedly low friction qualities. Particularly significant is the elimination of the huge friction which normally accompanies the use of high pressures. The advantages of high pressure systems in airplane controls and the like are well known and this invention overcomes the major hurdle confronting their use.

It will be understood that the embodiments of the invention described are exemplary only and that other applications may be made thereof without departing from the scope of the invention which is intended to be defined by the appended claims.

What is claimed is:

1. In a seal construction, a first part formed with an interiorly directed recess, a second part movable relative to the first part and alongside said recess, a first fluid-seal element formed of flexible material having a low coefficient of friction with the second part and L-shaped in cross section and seated in said recess so that one leg thereof lies along the end of said recess while the other leg of relatively thin construction lies along said second part, and a second fluid-seal element formed of resilient material and generally round in cross section and disposed in said recess behind said first element so as to leave the free end of the other leg exposed and so as to be subjected to compressive stresses which make it conform with the surfaces of the first part and of the first element and the first element with the surface of the second part, said second element being forced against the one leg lying along the end of said recess when contacted by fluid under pressure and thereby rendered further effective to make it conform with the surfaces of the first part and of the first element and the first element with the surface of the second part.

2. In a seal construction, a part generally round in cross-section, a second part encompassing said first part so as to mate with it, said parts being relatively movable, an interiorly directed recess formed in one of said parts so as to lie adjacent the mating surface of the other part, a first ring-like fluid-seal element formed of flexible material having a low coefficient of friction with the other part and L-shaped in cross section and seated in said recess so that one leg thereof lies along the end of said recess while the other leg of relatively thin construction lies along said other part, and a second ring-like fluid-seal element formed of resilient material and generally round in cross section and disposed in said recess behind said first ring-like element so as to leave the free end of the other leg exposed and so as to be subjected to compressive stresses which make it conform with the surfaces of the one part and of the first element and the first element with the surface of the other part, said second element being forced against the one leg lying along the end of said recess when contacted by fluid under pressure and thereby rendered further effective to make it conform with the surfaces of the one part and of the first element and the first element with the surface of the second part.

References Cited in the file of this patent

UNITED STATES PATENTS

| | | |
|---|---|---|
| 2,494,598 | Waring | Jan. 17, 1950 |
| 2,784,013 | Groen | Mar. 5, 1957 |

FOREIGN PATENTS

| | | |
|---|---|---|
| 170,175 | Austria | Jan. 25, 1952 |
| 1,049,256 | France | Aug. 10, 1953 |